United States Patent
Kikukawa et al.

(10) Patent No.: US 7,813,109 B2
(45) Date of Patent: Oct. 12, 2010

(54) SWITCHGEAR

(75) Inventors: Shuichi Kikukawa, Hitachi (JP); Kenji Tsuchiya, Hitachi (JP); Yuko Kajiyama, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 12/366,965

(22) Filed: Feb. 6, 2009

(65) Prior Publication Data

US 2009/0237869 A1    Sep. 24, 2009

(30) Foreign Application Priority Data

Mar. 18, 2008    (JP) .............................. 2008-068661

(51) Int. Cl.
*H02B 1/20*    (2006.01)
*H01H 33/66*    (2006.01)

(52) U.S. Cl. ........................ 361/612; 361/605; 361/602; 361/611; 218/43; 218/118; 218/153; 218/154

(58) Field of Classification Search ................. 361/602, 361/604, 605, 611, 612, 617, 614, 620–624, 361/632, 637, 634, 640–648, 675–678; 200/307, 200/50.28, 50.32, 50 A, 48 R, 48 V, 48 SB, 200/144 B, 71 B, 145; 218/2–14, 43, 16, 218/70, 78, 84, 92, 118, 119, 120, 153, 154, 218/143, 140; 174/5 R, 542, 71 B, 72 B, 174/17 GF, 68.2, 50.54, 106 SC, 35 GC, 174/35 MS, 35 C; 277/227–235

See application file for complete search history.

(56) References Cited

U.S. PATENT DOCUMENTS 4,136,374 A * 1/1979 Rosey et al. ................. 361/614
4,362,914 A * 12/1982 Adolph et al. .............. 218/119
4,677,524 A * 6/1987 Shiraishi et al. ............. 361/605
5,124,881 A * 6/1992 Motoki ....................... 361/605
5,486,662 A * 1/1996 Takiishi .................... 200/50.27
6,268,579 B1 * 7/2001 Kajiwara et al. ............ 218/153
6,410,875 B2 * 6/2002 Allard et al. ................ 218/118
6,849,819 B2 * 2/2005 Tresy et al. ..................... 218/3
7,457,105 B2 * 11/2008 Kikukawa et al. ........... 361/605

FOREIGN PATENT DOCUMENTS

| EP | 0543352 A1 | 5/1993 |
| EP | 15487779 A2 | 6/2005 |
| JP | 1693873 A2 | 8/2006 |
| JP | 2006-238522 | 9/2006 |

OTHER PUBLICATIONS

Extended European Search Report Dated Jul. 6, 2009 in corresponding European Application No. 09002163.

* cited by examiner

*Primary Examiner*—Michael V Datskovskiy
(74) *Attorney, Agent, or Firm*—Brundidge & Stanger, P.C.

(57) ABSTRACT

Switchgear having a vacuum-insulated switchgear 2 comprising switches having at least breaking and disconnecting functions, each placed in a unit, and solid-insulated bus bars 12 for electrically connecting the switches in each unit; an air-insulated switchgear 1 comprising switches having at least breaking and disconnecting functions, each placed in a unit, and air-insulated bus bars for electrically connecting the switches in each unit; and_the vacuum-insulated switchgear 2 and the air-insulated switchgear 1 are installed side-by-side, wherein the vacuum-insulated switchgear 2 and the air-insulated switchgear 1 are electrically connected through flexible conductors 17 which are provided between the solid-insulated bus bars 12 and the air-insulated bus bars.

11 Claims, 6 Drawing Sheets

SWITCHGEAR

CLAIM OF PRIORITY

The present application claims priority from Japanese patent application serial No. 2008-068661, filed on Mar. 18, 2008, the content of which is hereby incorporated by reference into this application.

BACKGROUND OF THE INVENTION

1. Field of the Invention

The present invention relates to switchgears, and in particular, to switchgear suitable for multiple, parallel installation (hereinafter, referred to as side-by-side installation) of a vacuum-insulated switchgear to an existing air-insulated switchgear.

2. Description of Related Art

Power receiving facilities are provided with switchgears which include a circuit breaker for cutting off load current or accident current, a disconnecting switch and a grounding switch for ensuring workers' safety during load maintenance checks, a detector for detecting system voltage or current, a protective relay, and so on.

There are a wide variety of insulation methods for switchgears. In addition to a conventional air-insulated module and a cubicle-type gas-insulated switchgear (GIS) which uses $SF_6$ gas as an insulating gas, switchgears of a solid insulation type, compressed-air insulation type, and total vacuum insulation type are being developed in recent years from a viewpoint of environmental responsiveness.

While each component, i.e., the breaker, disconnecting switch, and grounding switch, is being acceleratingly miniaturized by using the variety of insulation methods mentioned above, the following vacuum-insulated switchgear has been proposed, in which a double-break three-position vacuum-insulated switch having breaking and disconnecting functions and a vacuum-insulated grounding switch are combined into a single body by epoxy casting (for example, see Patent Document 1.)

The vacuum-insulated switchgear mentioned above has a unit inside its case, in which unit, a vacuum container containing the double-break three-position vacuum switch having breaking and disconnecting functions, and a vacuum container containing the switch having a grounding function are combined into a single body by epoxy casting. Being small, lightweight, and highly reliable, the vacuum-insulated switchgear can meet the requirements for smaller, lighter equipment in, for example, power distribution facilities in an urban region.

Furthermore, in recent years, user demands for power receiving facilities have become more diversified. For example, since every demand-site has different types of load and operating conditions depending on their purposes, each distribution system must be planned according to the user requirements considering system safety, reliability, operation maintenance, and future load addition. In this distribution system planning, the aspects of controlling a breaker, disconnecting switch, and grounding switch making up the power receiving facility as well as of monitoring and measuring voltage and current must also be taken into consideration.

In this case, the key point is how to reduce installation space for the above components and for various devices for controlling, monitoring, and measuring the components, to minimize investment cost for installation. Being small, lightweight, and highly reliable, the vacuum-insulated switchgear described above can flexibly meet various needs of the users.

In the distribution system planning, users may request new installation, additional installation, and/or relocation of a variety of switchgears. Especially for new installation of switchgears, not all switchgears in the substation can be newly installed at once due to a financial reason. This forces only a few switchgears to be installed at first. In this case, or in a case of additional installation of switchgears, the vacuum-insulated switchgears must be operated concurrently with existing air-insulated switchgears. In other words, the vacuum-insulated switchgears are to be phased in, replacing the existing air-insulated switchgears, as the recent vacuum-insulated switchgears, using a high insulation performance of vacuum, have been developed to be smaller than the air-insulated switchgears.

Here, the vacuum-insulated switchgear means a switchgear having switches such as a vacuum breaker, each placed individually in a plurality of units, are electrically connected by solid-insulated bus bars; and the air-insulated switchgear means a switchgear having switches such as a vacuum breaker, each placed in each unit, are electrically connected by air-insulated bus bars.

Patent Document 1: Japanese Patent Application Laid-open No. 2006-238522

SUMMARY OF THE INVENTION

However, in such switchgear installation, the switchgear is more likely to be installed side by side with multiple other switchgears rather than to be installed stand-alone. Replacing all air-insulated switchgears installed side by side, with vacuum-insulated switchgears at once would cost too much, which hinders the introduction of vacuum-insulated switchgears.

In addition, when a vacuum-insulated switchgear is to be installed side by side with an air-insulated switchgear, while the air-insulated switchgear having connecting bus bars made with air-insulated naked conductors, requires a long insulation distance between the connecting bus bars, the vacuum-insulated switchgear having connecting bus bars made with solid-insulated conductors, does not require a long insulation distance between its connecting bus bars.

As described above, since the air-insulated switchgear and the vacuum-insulated switchgear require different insulation distances for their bus bars, unless the insulation distance between the bus bars could be adjusted, it would be difficult to connect the bus bars of these switchgears; or in other words, the side-by-side installation of the air-insulated switchgear and the vacuum-insulated switchgear would be difficult.

The present invention is made in view of the above situation, and a first object of the present invention is to provide switchgear which allows easy adjustment of the insulation distance between bus bars of the switchgears requiring different insulation distances between their bus bars, and allows side-by-side installation of an air-insulated switchgear and a vacuum-insulated switchgear.

A second object of the present invention is to provide a switchgear which allows side-by-side installation of the air-insulated switchgear and the vacuum-insulated switchgear without increasing the installation area.

In order to achieve the first object, a switchgear of the present invention is characterized by: a vacuum-insulated switchgear comprising switches having at least breaking and disconnecting functions, each placed in a unit, and solid-insulated bus bars for electrically connecting the switches in each unit; an air-insulated switchgear comprising switches having at least breaking and disconnecting functions, each placed in a unit, and air-insulated bus bars for electrically connecting the switches in each unit; and_the vacuum-insulated switchgear and the air-insulated switchgear are installed side-by-side, wherein the vacuum-insulated switchgear and the air-insulated switchgear are electrically connected through flexible conductors which are provided between the solid-insulated bus bars and the air-insulated bus bars.

Also, in order to achieve the second object, a switchgear of the present invention is characterized by: a switchgear having a vacuum-insulated switchgear comprising switches having at least breaking and disconnecting functions, each placed in a unit, and solid-insulated bus bars for electrically connecting the switches in each unit; an air-insulated switchgear comprising switches having at least breaking and disconnecting functions, each placed in a unit, and air-insulated bus bars for electrically connecting the switches in each unit; and_the vacuum-insulated switchgear and the air-insulated switchgear are installed side-by-side, wherein the vacuum-insulated switchgear and the air-insulated switchgear are electrically connected through conductors which are provided between the solid-insulated bus bars and the air-insulated bus bars, and the length of the long side of the vacuum-insulated switchgear is shorter than the length of the long side of the air-insulated switchgear, the air-insulated switchgear further comprising a case disposed in a space created by side-by-side installation of the vacuum-insulated switchgear and the air-insulated switchgear, wherein the conductors and connections being connected between the conductors and the solid-insulated bus bars and the air-insulated bus bars are disposed in the case.

The switchgear of the present invention allows side-by-side installation of the air-insulated switchgear and the vacuum-insulated switchgear since the insulation distance between their bus bars can be easily adjusted through flexible conductors for connecting the solid-insulated bus bars and the air-insulated bus bars even when the required insulation distances are different between these bus bars in the air-insulated switchgear and the vacuum-insulated switchgear. Thus, the present invention facilitates introduction of vacuum-insulated switchgears.

The length of the long side of the vacuum-insulated switchgear module is shorter than the length of the long side of the air-insulated switchgear module, so that a case can be disposed in the space created by installing the switchgears side by side, in which case, the conductors and connections of the solid-insulated bus bars and the air-insulated bus bars are placed. Thus, no special space is needed for connecting the vacuum-insulated switchgear and the air-insulated switchgear. That is, the present invention allows the side-by-side installation of the air-insulated switchgear and the vacuum-insulated switchgear without increasing the installation area.

DETAILED DESCRIPTION OF THE PREFERRED EMBODIMENTS

In a switchgear of the present invention with an easy configuration, the object is achieved here, that is to provide a switchgear which allows easy adjustment of the insulation distance between bus bars of the switchgears requiring different insulation distances between their bus bars, and allows side-by-side installation of an air-insulated switchgear and a vacuum-insulated switchgear.

Embodiment 1

A switchgear of the present invention according to the first embodiment is described below using FIGS. 1 to 6.

Figure 1:
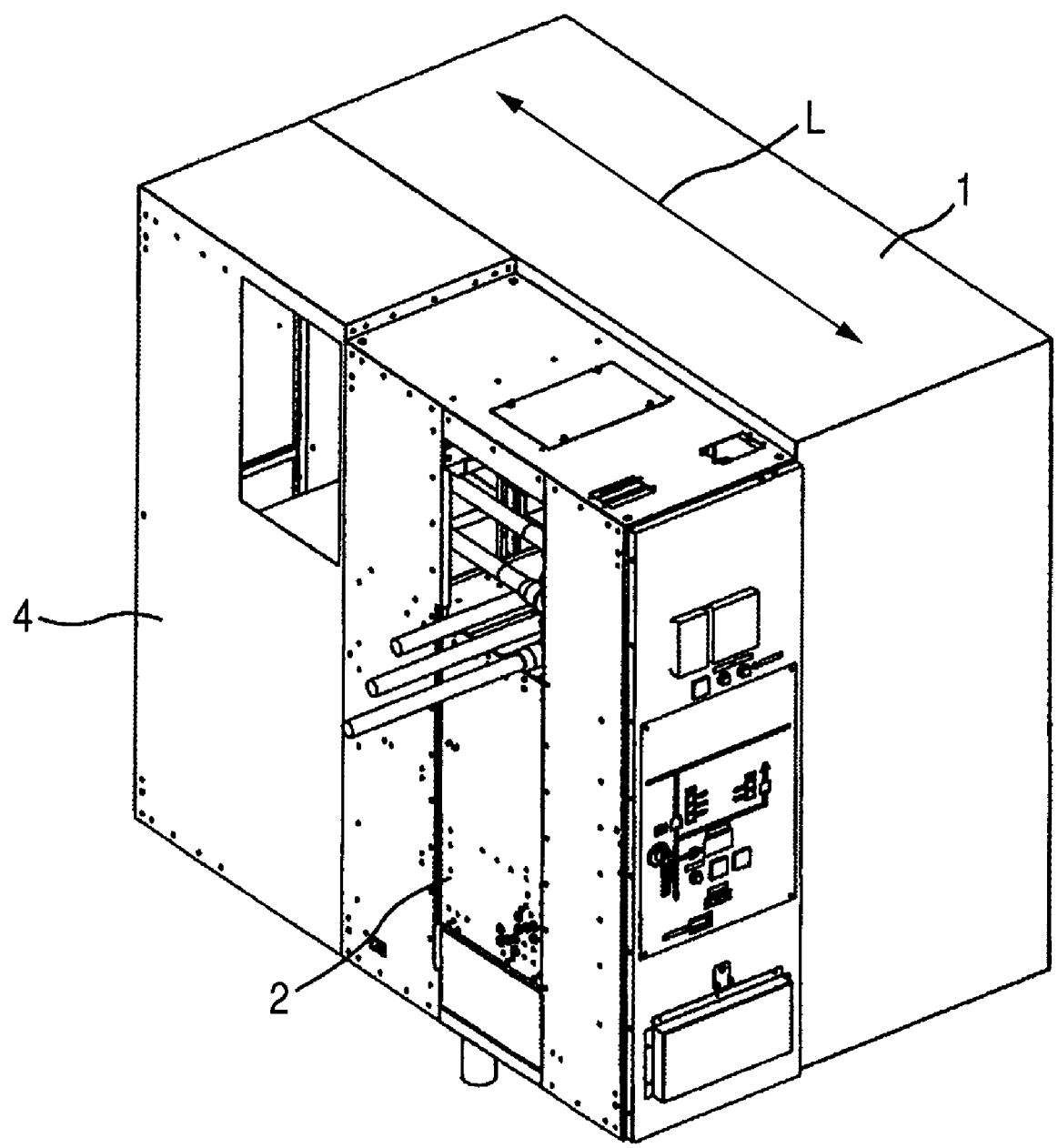
FIG. 1 is a perspective view showing side-by-side installation of an air-insulated switchgear and a vacuum-insulated switchgear in a first embodiment of the switchgear of the present invention.
Figure 2:
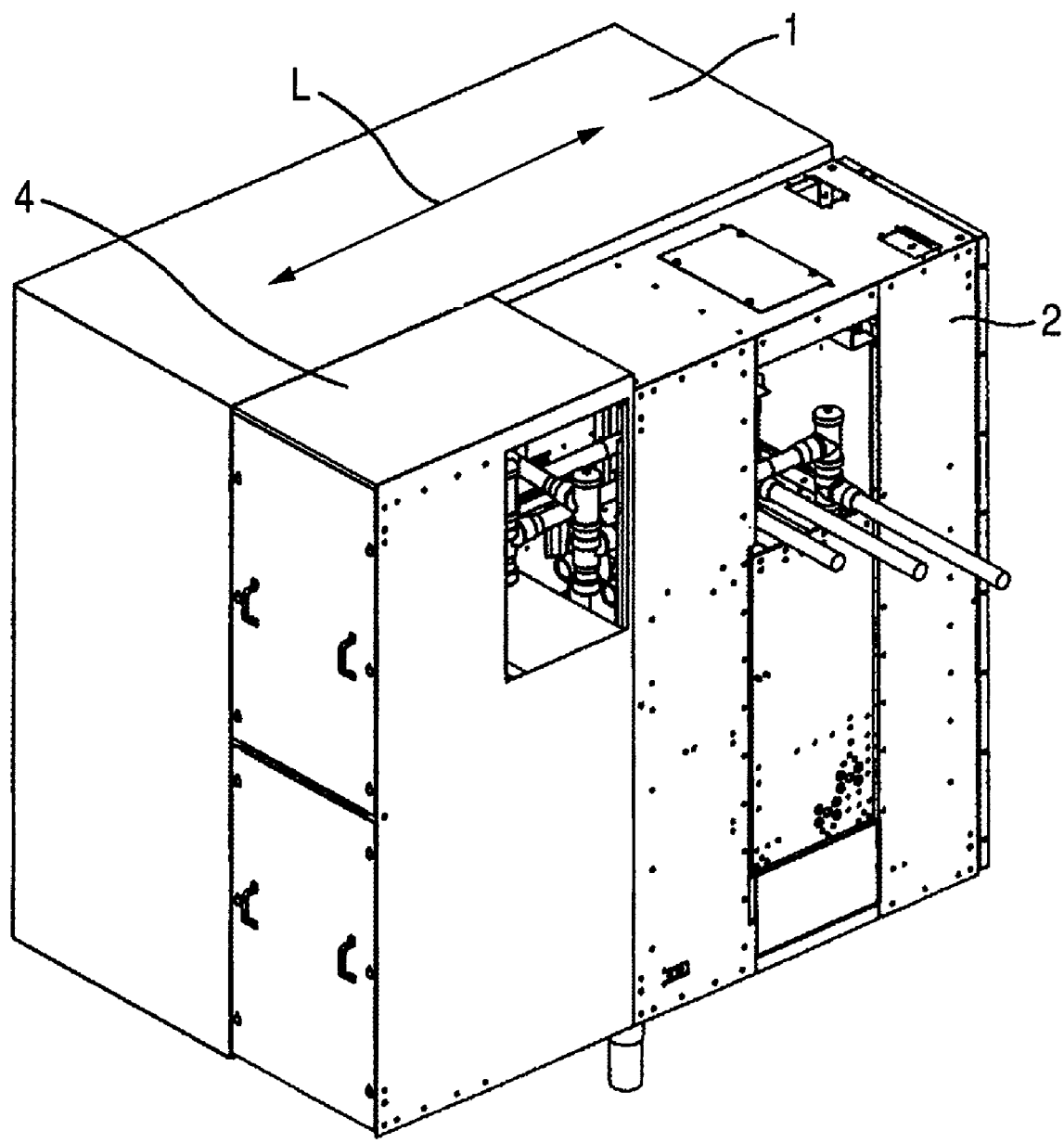
FIG. 2 is a perspective view of the switchgear in the first embodiment of the present invention viewed from another angle than FIG. 1.

FIGS. 1 and 2 are perspective views of the whole side-by-side installation structure of a vacuum-insulated switchgear 2 and an existing air-insulated switchgear 1, viewed from different angles.

As shown in the figures, 1 is an air-insulated switchgear. In the air-insulated switchgear 1, switches (for example, a vacuum breaker) having breaking and disconnecting functions are individually placed in air inside units, and the switches such as a vacuum breaker, placed in each unit are electrically connected through air-insulated bus bars, although not shown in the figures. On the other hand, 2 is a vacuum-insulated switchgear. In the vacuum-insulated switchgear 2, a vacuum container containing a double-break three-position vacuum-insulated switch and a vacuum container containing a grounding switch are combined into a single body by epoxy casting and placed in a case as described in FIG. 5 of the Patent Document 1. The switches such as a vacuum beaker, individually placed in a plurality of units, are electrically connected through solid-insulated bus bars in the vacuum-insulated switchgear 2. These switchgears 1 and 2 are installed side by side and electrically connected through a connecting unit.

In the present embodiment, the length of the long side of the vacuum-insulated switchgear 2 (in direction L in FIGS. 1 and 2) is shorter than the length of the long side of the air-insulated switchgear 1; therefore, when the switchgears 1 and 2 are installed side by side, a space is created by the long side of the vacuum-insulated switchgear 2 for the length shorter than the air-insulated switchgear 1, in which space, a case 4 is disposed to place the connecting unit therein.

The connecting unit, which is to be described in detail later, overall comprises: a first solid-insulated bus bar 11 connected to a connecting bus bar pulled out from the top of the vacuum container, connected to the vacuum breaker of the vacuum-insulated switchgear 2; a second solid-insulated bus bar 12 connected to the first solid-insulated bus bar 11, a part of the second solid-insulated bus bar 12 extends inside the case 4; and a flexible, third solid-insulated bus bar 17 connected to the second solid-insulated bus bar 12 from inside the case 4, and also connected to a connecting bus bar from the air-insulated switchgear 1.

The connecting unit mentioned above is described in detail using FIGS. 5 and 6. In the figures, 11 is one of the first solid-insulated bus bars of three phases extending horizontally, one end of which is fixed to the vacuum breaker of the vacuum-insulated switchgear 2, the other end of which is connected to a solid-insulated connection 13 connected to a bus bar vertically pulled out from the top of the vacuum container. The opposite end of the first solid-insulated bus bar 11 from the solid-insulated connection 13 is connected, for example, to another vacuum-insulated switchgear not shown in the figures. This first solid-insulated bus bar 11 can rotate in a horizontal plane with the solid-insulated connection 13, centering the inner conductor of the connection 13.

Next, a second solid-insulated bus bar 12 horizontally extends to the direction orthogonal to the vertical direction (crossing direction over the first solid-insulated bus bar 11) of the solid-insulated connection 13 fixed to the first solid-insulated bus bar 11; one end of the second solid-insulated bus bar 12, on top of the solid-insulated connection 13, is an upper solid-insulated connection 14 disposed vertically to the extending direction of the second solid-insulated bus bar 12 and fixed to the second solid-insulated bus bar 12; and the second solid-insulated bus bar 12 can rotate in a horizontal plane with the upper solid-insulated connection 14, centering the inner conductor of the connection 14.

As described above, the first solid-insulated bus bar 11 and the second solid-insulated bus bar 12, with the solid-insulated connection 13 and the upper solid-insulated connection 14, are connected rotatably in the horizontal plane, respectively; and in addition, the second solid-insulated bus bar 12 is fixed to a solid-insulated connection 15 disposed vertically to the extending directing of the second solid-insulated bus bar 12 at the opposite end from the solid-insulated connection 14; and an upper solid-insulated connection 16 is disposed on top of the solid-insulated connection 15. This upper solid-insulated connection 16 is fixed to a solid-insulated cable 17 which is the third solid-insulated bus bar extending in a horizontal direction. The solid-insulated cable 17 as the third solid-insulated bus bar has, for example, a stranded copper wire as its inner conductor for flexibility, which wire is covered with insulating rubber such as silicone rubber for example, which insulating rubber is further covered with conductive rubber at ground potential.

Furthermore, the solid-insulated connection 15 and the second solid-insulated bus bar 12, and the solid-insulated connection 16 and the solid-insulated cable 17 are rotatable centering the inner conductors of the connections 15, 16; and the second solid-insulated bus bar 12 and the solid-insulated cable 17, with the solid-insulated connection 15 and the solid-insulated connection 16, are rotatable in a horizontal plane, respectively. The lower part of the solid-insulated connection 15 is connected to an insulator 19, and the lower part of the insulator 19 is fixed to a fixing frame 20 supported by inside of the case 4.

On the other hand, the opposite end of the solid-insulated cable 17 from the solid-insulated connection 16 is connected to an air-insulated terminal 21 having a pleated structure made of insulating material around the inner conductor; and an insulation distance required in air is maintained between each air-insulated terminal 21 of three phases. The air-insulated terminal 21 is connected to an inner naked bus bar conductor inside the air-insulated switchgear 1 through a connecting conductor 22.

Each of the first solid-insulated bus bars 11, the second solid-insulated bus bars 12, the solid-insulated connections 13, 14, 15, and 16, and the solid-insulated cables 17, is solid-insulated such that its conductor is covered with insulating rubber such as silicone rubber for example, and is further covered with conducting rubber to be at ground potential. On the other hand, around each air-insulated terminal 21 is not at ground potential, but to be at an intermediate potential.

Figure 3:
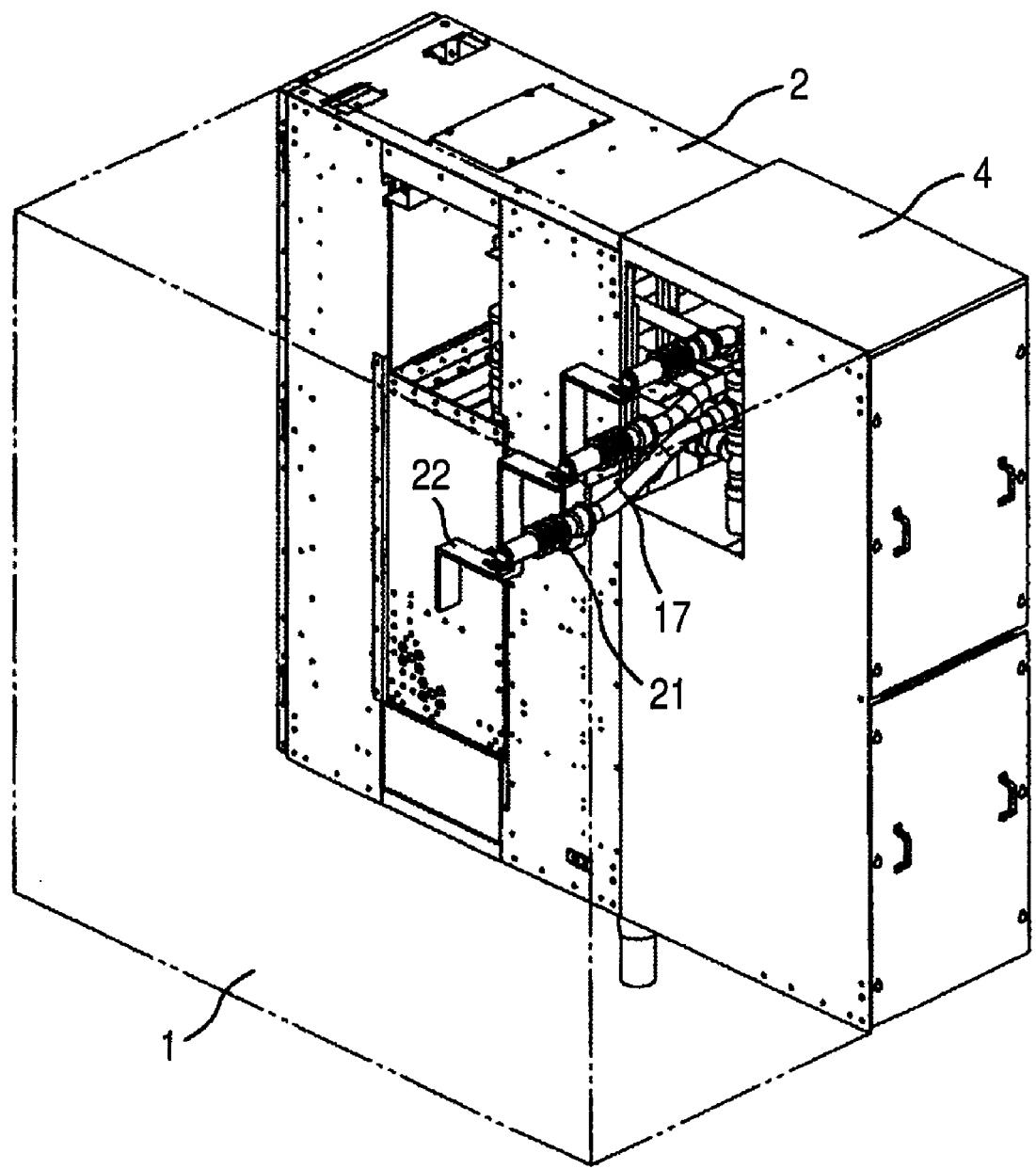
FIG. 3 is a perspective view showing an installation example of a connecting unit inside the air-insulated switchgear in the first embodiment of the switchgear of the present invention.
Figure 4:
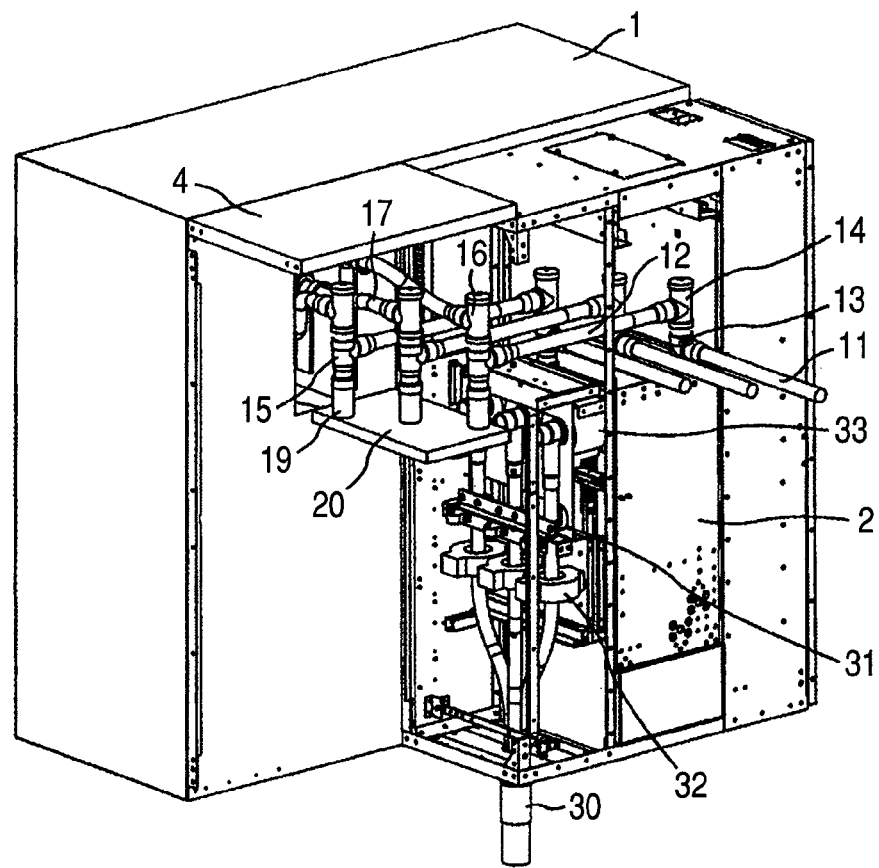
FIG. 4 is a partially cutout perspective view showing an installation example of the connecting unit inside a frame and an inside of the vacuum-insulated switchgear in the first embodiment of the switchgear of the present invention.
Figure 5:
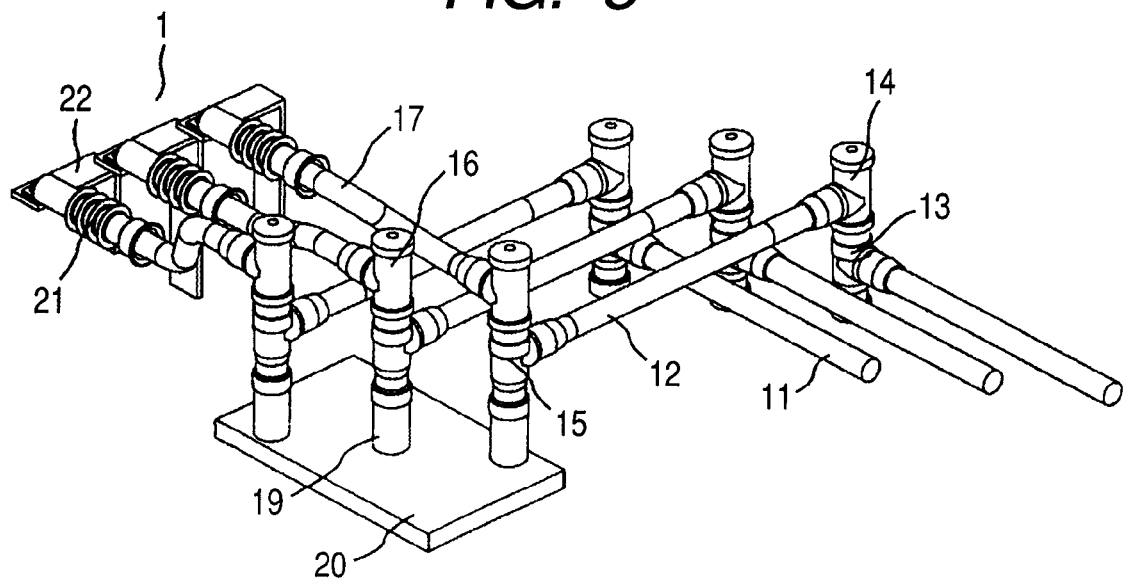
FIG. 5 is a partial perspective view showing the connecting unit adopted in the first embodiment of the switchgear of the present invention.
Figure 6:
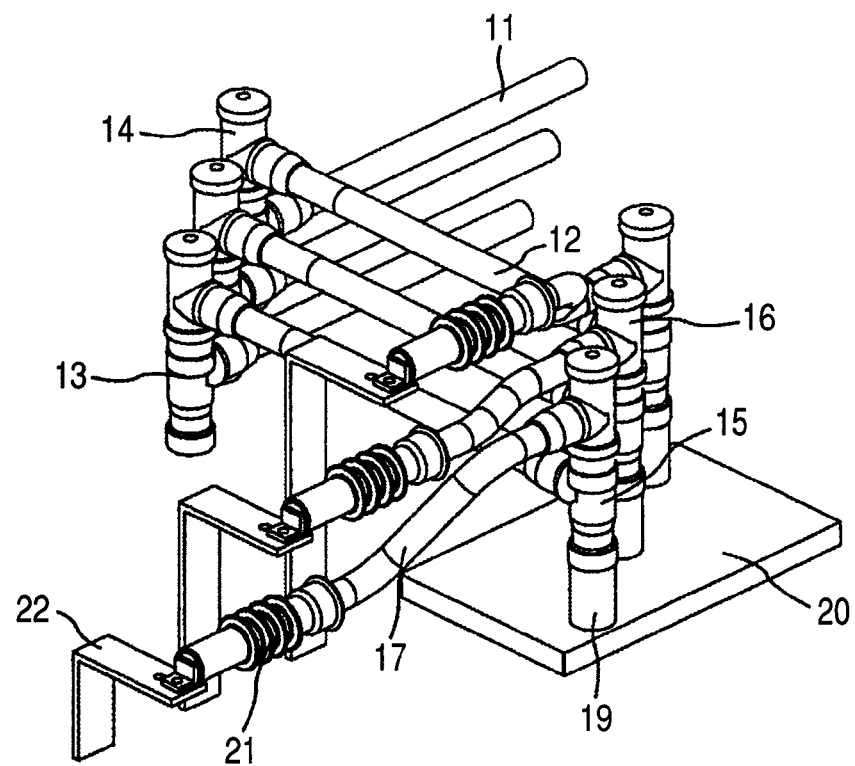
FIG. 6 is a perspective view of the connecting unit shown in FIG. 5 viewed from another angle adopted in the first embodiment of the switchgear of the present invention.

Installation location of each part of the connecting unit described above when the air-insulated switchgear 1 and the vacuum-insulated switchgear 2 are installed side by side is described using FIGS. 3 and 4.

As shown in the figures, the first solid-insulated bus bars 11 are disposed from the solid-insulated connections 13 extending from the top of the vacuum container of the vacuum-insulated switchgear 2, to outside of the vacuum-insulated switchgear 2, and are connected, for example, to another adjacent vacuum-insulated switchgear. On the other hand, the second solid-insulated bus bars 12 are disposed from inside the vacuum-insulated switchgear 2 partially into the case 4, and are supported by the fixing frame 20 in the case 4. Furthermore, the solid-insulated cables 17 are disposed from inside the case 4 into the air-insulated switchgear 1; and the air-insulated terminals 21 to be connected to each end of the solid-insulated cables 17 are connected to the naked bus bar conductors inside the air-insulated switchgear 1 through the connecting conductors 22.

In FIG. 4, 30 is a cable, 31 is a support for the cable 30, 32 is a current transformer for measurement, 33 is a current transformer for protection, and all of them are disposed inside the vacuum-insulated switchgear 2 module.

As described above, the present embodiment allows the vacuum-insulated switchgear 2 to be installed side by side with the existing air-insulated switchgear 1 by using the above connecting unit; thus, the vacuum-insulated switchgears 2 can be introduced into the existing air-insulated switchgears 1. This facilitates introduction of the vacuum-insulated switchgears.

In the present embodiment, the inner conductor of the solid-insulated cable 17 is made with, for example, a stranded copper wire for flexibility, the wire is covered with insulating rubber such as silicone rubber for example, and the insulating rubber is further covered with conductive rubber at ground potential.

From above, even when the insulation distance between the naked bus bar conductors inside the air-insulated switchgear 1 is long and the insulation distance between the solid-insulated bus bars inside the vacuum-insulated switchgear 2 is short, a difference in the insulation distances between the bus bars can be adjusted by the flexible solid-insulated cables 17 and by increasingly expanding the insulation distance between the bus bars from the vacuum-insulated switchgear 2 toward the air-insulated switchgear 1. In this way, the bus bars having different insulation methods can be connected. As a result of this connectability of the bus bars having different insulation methods, side-by-side installation of the vacuum-insulated switchgear 2 and the air-insulated switchgear 1 has become possible.

In addition, in the present embodiment, since the inner conductors of the above bus bars or cables are solid-insulated, no dielectric breakdown will occur when their insulation distances are decreased; thus space can be saved.

Furthermore, in the present embodiment, by allowing two insulated switchgears of difference sizes to be combined together (in this embodiment, the vacuum-insulated switchgear 2 is made smaller than the air-insulated switchgear 1), a surplus space is created by the smaller switchgear, in which space the connecting unit can be installed as in the present embodiment. Since no specific space for installing the connecting unit (an installation portion) is needed, the present embodiment can save space overall.

In addition, since the present embodiment uses the solid-insulated connections 13, 14, 15, and 16 which are rotatable with solid-insulated bus bars, when a layout is to be changed, the first solid-insulated bus bars 11, the second solid-insulated bus bars 12 or the solid-insulated cables 17 can be installed at any angle in a horizontal direction. This increases freedom in design or production.

The solid-insulated bus bars are made up from not only a single bus bar but from a combination of multiple bus bars and the like, so the most suitable structure, for example, a flexible structure or a pleated structure, can be selected for every part. Furthermore, since each air-insulated terminal 21 has a pleated structure made of insulating material, the insulation distance created by the insulator between the naked bus bar conductor inside the air-insulated switchgear 1 and the conducting rubber of the solid-insulated cable 17 at ground potential, can be extended corresponding to the length of the pleats; thus even when the total length of the air-insulated terminal 21 is shortened, short-circuiting can be prevented. This is advantageous in component size reduction.

Embodiment 2

Figure 7:
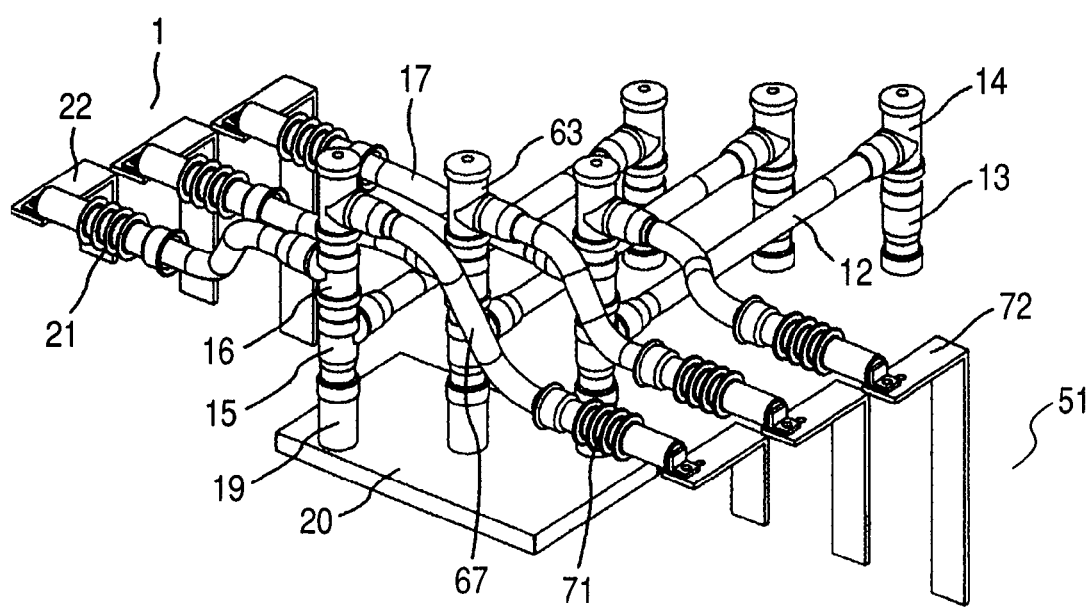
FIG. 7 is a partial perspective view showing a connecting unit adopted in a second embodiment of the switchgear of the present invention.
Figure 8:
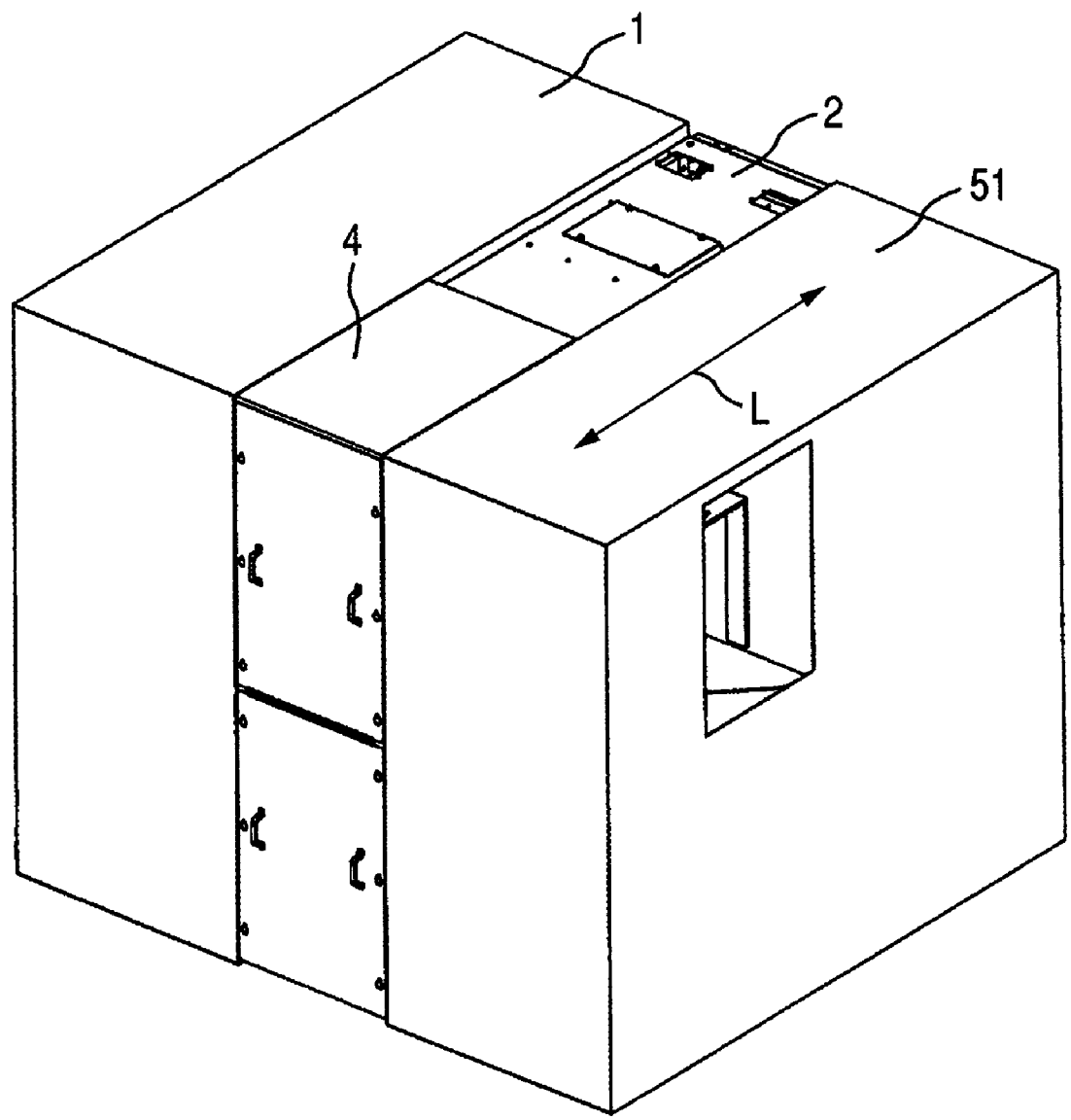
FIG. 8 is a perspective view showing side-by-side installation of air-insulated switchgears and a vacuum-insulated switchgear in the second embodiment of the switchgear of the present invention.

A switchgear of the present invention according to the second embodiment is described using FIGS. 7 and 8. In this embodiment, as shown in FIG. 8, a vacuum-insulated switchgear 2 is sandwiched between two air-insulated switchgears 1 and 51 in side-by-side installation.

The connection between the vacuum-insulated switchgear 2 and the air-insulated switchgear 1 in this embodiment is the same as the embodiment 1 described above, thus the description is omitted. Only the connection between the vacuum-insulated switchgear 2 and the air-insulated switchgear 51 is explained here.

The vacuum-insulated switchgear 2 and the air-insulated switchgear 51 in the present embodiment are electrically connected through a connecting unit inside a case 4.

The connecting unit in the present embodiment is structured as follow. That is, as shown in FIG. 7, an upper solid-insulated connection 63 is disposed on the upper part of a solid-insulated connection 16 (the opposite side from a solid-insulated connection 15), to which, one end of a flexible solid-insulated cable 17 is fixed to the solid-insulated connection 16 to be rotatable in a horizontal plane as a single part; and the solid-insulated connection 63 is fixed to a solid-insulated cable 67 having the same structure as the solid-insulated cable 17, disposed inside the case 4, and is rotatable in a horizontal plane with the solid-insulated cable 67, centering the inner conductor of the connection 63.

On the other hand, the other end of the solid-insulated cable 67 is connected to an air-insulated terminal 71 having an insulating pleated structure around, and the required insulation distance in air is ensured between the adjoining air-insulated terminals 71. These air-insulated terminals 71 are connected to naked bus bar conductors inside the air-insulated switchgear 51 through connecting conductors 72.

The solid-insulated cable 67, in the same way as the solid-insulated cable 17 in the first embodiment, is solid-insulated such that its inner conductor made with, for example, a stranded copper wire for flexibility is covered with insulating rubber such as silicone rubber for example, and further covered with conducting rubber for grounding. The solid insulating connection 63 is solid-insulated such that its conductor is covered with insulating rubber such as silicone rubber for example, and further covered with conducting rubber for grounding. On the other hand, around the air-insulated terminal 71 is not grounded, but to be at an intermediate potential.

According to such structure of the present embodiment, not only the same effects as in the embodiment 1 can be achieved but also the vacuum-insulated switchgear can be installed side by side with a plurality of air-insulated switchgears.

What is claimed is:

1. Switchgear having a vacuum-insulated switchgear comprising switches having at least breaking and disconnecting functions, each placed in a unit, and solid-insulated bus bars for electrically connecting the switches in each unit;

an air-insulated switchgear comprising switches having at least breaking and disconnecting functions, each placed in a unit, and air-insulated bus bars for electrically connecting the switches in each unit; and the vacuum-insulated switchgear and the air-insulated switchgear are installed side-by-side, wherein the vacuum-insulated switchgear and the air-insulated switchgear are electrically connected through flexible conductors which are provided between the solid-insulated bus bars and the air-insulated bus bars.

2. The switchgear according to claim 1, wherein an inner conductor of the solid-insulated bus bar is covered with solid insulating material, around which material is maintained at ground potential, and the conductor is a flexible conductor which comprises a stranded inner conductor covered with solid insulating material, around which material is maintained at ground potential.

3. The switchgear according to claim 1, wherein, to the vacuum-insulated switchgear in the opposite side from the installation of the air-insulated switchgear, another air-insulated switchgear is installed for electrically connected to the vacuum-insulated switchgear through another flexible solid-insulated conductors.

4. The switchgear according to claim 2, wherein the flexible conductor covered with solid insulating material is connected with a connecting conductor connected to a naked bus bar conductor in the air-insulated switchgear through an air-insulated terminal, around which terminal is not maintained at ground potential.

5. The switchgear according to claim 2, wherein the solid-insulated bus bar is installed rotatably in a horizontal plane centering the inner conductor.

6. The switchgear according to claim 4, wherein the air-insulated terminal has a pleated insulator covering the inner conductor.

7. Switchgear having a vacuum-insulated switchgear comprising switches having at least breaking and disconnecting functions, each placed in a unit, and solid-insulated bus bars for electrically connecting the switches in each unit;

an air-insulated switchgear comprising switches having at least breaking and disconnecting functions, each placed in a unit, and air-insulated bus bars for electrically connecting the switches in each unit; and the vacuum-insulated switchgear and the air-insulated switchgear are installed side-by-side, wherein the vacuum-insulated switchgear and the air-insulated switchgear are electrically connected through conductors which are provided between the solid-insulated bus bars and the air-insulated bus bars, and the length of the long side of the vacuum-insulated switchgear is shorter than the length of the long side of the air-insulated switchgear, the air-insulated switchgear further comprising a case disposed in a space created by side-by-side installation of the vacuum-insulated switchgear and the air-insulated switchgear, wherein the conductors and connections being connected between the conductors and the solid-insulated bus bars and the air-insulated bus bars are disposed in the case.

8. The switchgear according to claim 7, wherein the conductor for connecting the solid-insulated bus bar and the air-insulated bus bar is flexible conductor.

9. The switchgear according to claim 8, wherein an inner conductor of the solid-insulated bus bar is covered with solid insulating material, around which material is maintained as ground potential, and the flexible conductor comprises a stranded inner conductor covered with solid insulating material, around which material is maintained at ground potential.

10. The switchgear according to claim 7, wherein, to the vacuum-insulated switchgear in the opposite side from the installation of the air-insulated switchgear, another air-insulated switchgear is installed for electrically connected to the vacuum-insulated switchgear through another flexible solid-insulated conductors.

11. A vacuum-insulated switchgear comprising vacuum switches having at least breaking and disconnecting functions, each placed in a unit, and solid-insulated bus bars for electrically connecting the vacuum switches in each unit;

wherein the vacuum-insulated switchgear is provided with another solid-insulated bus bars for electrically connecting to an air-insulated switchgear having air-insulated bus bars, and the another solid-insulated bus bars are flexible bus bars.

* * * * *